(12) United States Patent
Guttenberger et al.

(10) Patent No.: US 8,142,321 B2
(45) Date of Patent: Mar. 27, 2012

(54) CONTROL DRIVE WITH ELECTRIC MOTOR AND PLANETARY GEAR MECHANISM

(75) Inventors: Richard Guttenberger, Greding (DE); Thomas Schreiber, Freystadt (DE)

(73) Assignee: Bühler Motor GmbH, Nürnberg (DE)

( * ) Notice: Subject to any disclaimer, the term of this patent is extended or adjusted under 35 U.S.C. 154(b) by 342 days.

(21) Appl. No.: 12/588,396

(22) Filed: Oct. 14, 2009

(65) Prior Publication Data

US 2010/0093478 A1 Apr. 15, 2010

(30) Foreign Application Priority Data

Oct. 15, 2008 (DE) .......................... 10 2008 053 571

(51) Int. Cl.
*F16H 48/06* (2006.01)
*B21D 53/28* (2006.01)
(52) U.S. Cl. ...................................... 475/149; 29/893.1
(58) Field of Classification Search .................. 475/149, 475/331, 334
See application file for complete search history.

(56) References Cited

U.S. PATENT DOCUMENTS

| | | | |
|---|---|---|---|
| 5,800,305 A | 9/1998 | Ra | |
| 2005/0046290 A1 | 3/2005 | Baukholt et al. | |
| 2005/0192151 A1 | 9/2005 | Simon | |
| 2006/0142114 A1 | 6/2006 | Fox | |

FOREIGN PATENT DOCUMENTS

| | | |
|---|---|---|
| DE | 2313698 A1 | 10/1974 |
| DE | 19729988 C1 | 8/1998 |
| DE | 19711423 C1 | 9/1998 |
| DE | 19829532 A1 | 1/2000 |
| DE | 10300641 A1 | 7/2004 |
| EP | 0667279 A1 | 8/1995 |
| EP | 1309071 A2 | 5/2003 |

*Primary Examiner* — Dirk Wright
(74) *Attorney, Agent, or Firm* — Jacobson Holman PLLC

(57) ABSTRACT

A control drive, consisting of an electric motor and a planetary gear mechanism flush with the electric motor on the same axis of symmetry, comprising a ring gear, a planet carrier and three planet gears mounted on the planet carrier, the planet gears each having a front surface in the assembly direction in the area of their external teeth and the ring gear in the region of its internal teeth having three angle areas assigned to the planet gears of its end opposite the assembly direction in a defined angle position of the planet carrier to ring gear. The task of the present invention is to ensure that an economical and time-decoupled simple and rapid assembly of the three planet gears in the ring gear is possible without increasing the manufacturing expense on this account, in which only slight changes to existing forms are necessary. This task is solved in that the axial spacing between the front surface of the first planet gear and the first angle area of ring gear assigned to it differs from the axial spacing between the front surface of the second planet gear and the second angle area of ring gear assigned to it and the axial spacing between the front surface of the third planet gear and the third angle area of ring gear assigned to it.

13 Claims, 4 Drawing Sheets

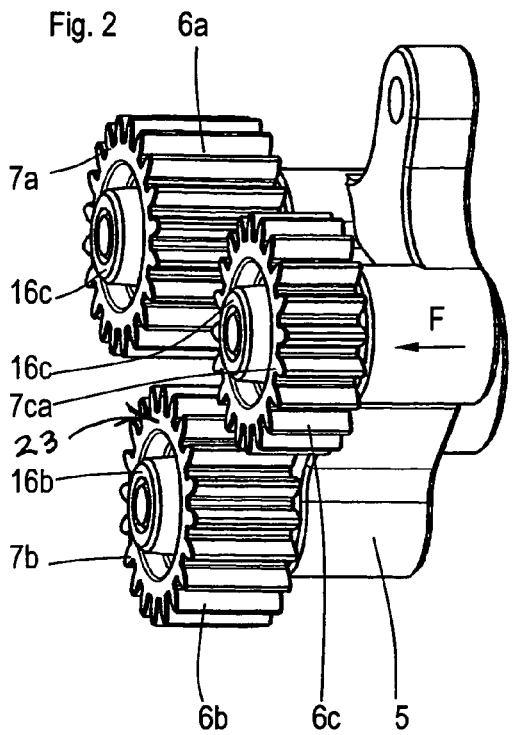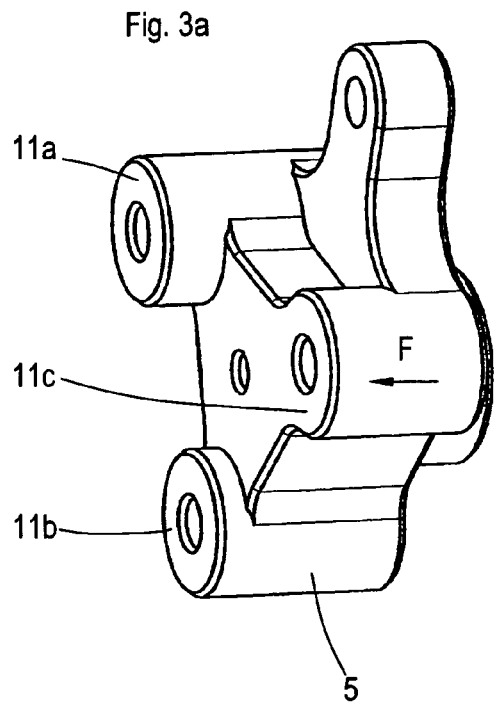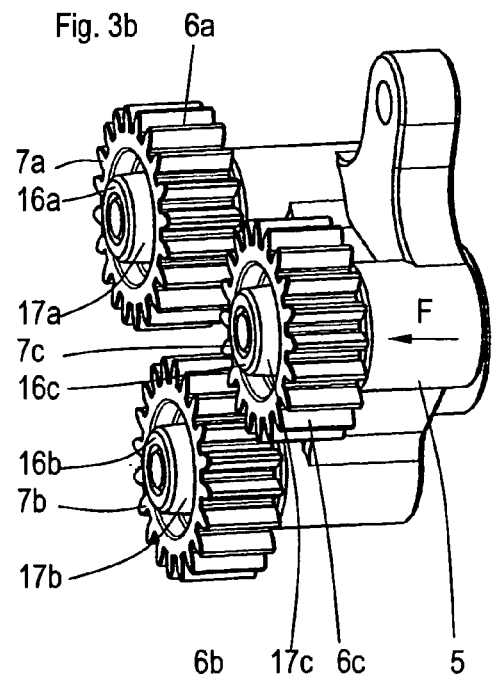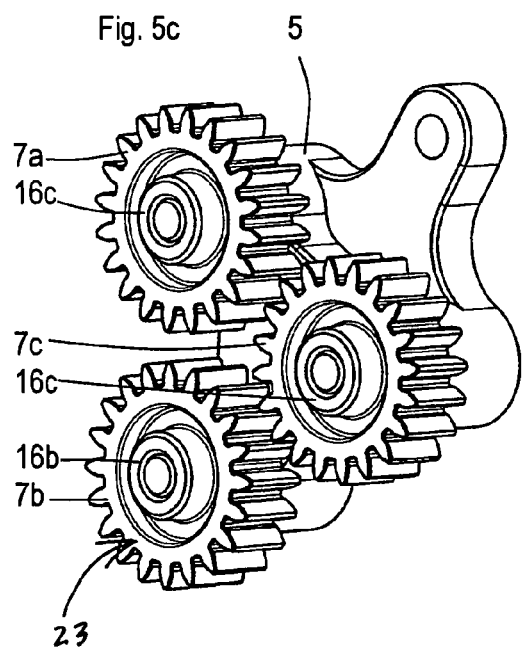

F

CONTROL DRIVE WITH ELECTRIC MOTOR AND PLANETARY GEAR MECHANISM

BACKGROUND OF THE INVENTION

1. Field of the Invention

The invention concerns a control drive, consisting of an electric motor and a planetary gear mechanism, comprising a ring gear, a planet carrier and several planet gears mounted on the planet carrier, the planet gears each having a front surface in the assembly direction F in the region of their external teeth, and the ring gear having, in the region of its internal teeth, several angle areas assigned to the planet gears of the end opposite the assembly direction F in a defined angle position of the planet carrier to ring gear.

2. Description of Related Art

A generic control drive is described in DE 197 29 988 C1, in which the angle areas of the end opposite the assembly direction are arranged in a single plane and the ends of the planet gears in front in the assembly direction are also arranged in a single plane, so that the individual spacings between the ends of the planet gears and the angle areas of the ring gear are the same in each assembly step, and also in the final assembly position. This geometric arrangement is problematical at the moment of assembly, in which the teeth of the three planet gears simultaneously engage with the teeth of the ring gear. Joining problems frequently occur here, because the angle position of the planet gears to each other and to the ring gear are not automatically aligned correctly. This leads at least to a reduction of assembly speed. Additionally, damage to the teeth can also occur.

The object of the present invention is therefore to ensure in a generic control drive that an economical and rapid assembly of the three planet gears in the ring gear is possible without increasing the manufacturing expense and assembly time, in which case only slight changes to the existing shapes are necessary.

BRIEF SUMMARY OF THE INVENTION

This task is accomplished according to the present invention in that the axial spacing (A1) between the front surface (7a) of the first planet gear (6a) and the first angle area (8a) of the ring gear (4) assigned to it differs from the axial spacing (A2) between the front surface (7b) of the second planet gear (6b) and the second angle area (8b) of the ring gear (4) assigned to it. Through this arrangement, the individual planet gears enter the assembly-critical tooth area of the ring gear independently of each other during the time of assembly, so that easier self-alignment of the planet gears is possible. This increases the assembly speed and reduces the frequency of errors during assembly. The invention can be applied to planetary gear mechanisms with two or more planet gears in the same gear stage.

When three planet gears are used in the same gear stage, it is prescribed that the axial spacing (A2) between the front surface (7a) of the second planet gear (6a) and the second angle area (8a) of ring gear (4) assigned to it differs from the axial spacing (A3) between the front surface (7b) of the third planet gear (6b) and the third angle area (8b) of ring gear (4) assigned to it and the axial spacing (A1) between the front surface (7c) of the first planet gear (6c) and the angle area (8c) of the ring gear (4) assigned to it.

In order to reliably accomplish the previously described task, it is important that the differences in spacings (A1, A2, A3) are greater than the axial displacements of the engagement edges 23 of the planet gears and the engagement edges 22 of the ring gear possibly through unavoidable tolerances, so that during assembly of the planet gears (6a, 6b, 6c), only one planet gear (6a, 6b, 6c) can reach the beginning of an engagement area between planet gears (6a, 6b, 6c) and ring gear (4). Ordinarily during assembly, angle inaccuracies can occur leading to there being slight play among the gears. Manufacturing tolerances are also always present. These influences add up to a calculable dimension that must absolutely be maintained, in order to achieve the mentioned advantages.

BRIEF DESCRIPTION OF THE SEVERAL VIEWS OF THE DRAWINGS

Specific embodiments of the invention are further explained below by means of the drawing. In the drawing:

FIG. 2 shows an assembled planet carrier according to a first embodiment, FIG. 3 shows a connector of a planet carrier according to a second embodiment, FIG. 3b shows an assembled planet carrier according to FIG. 3a, FIG. 4 shows a stylized sectional view of a third embodiment, FIG. 5c shows a mounted planet carrier according to the third embodiment.

DETAILED DESCRIPTION OF THE INVENTION

Figure 1:
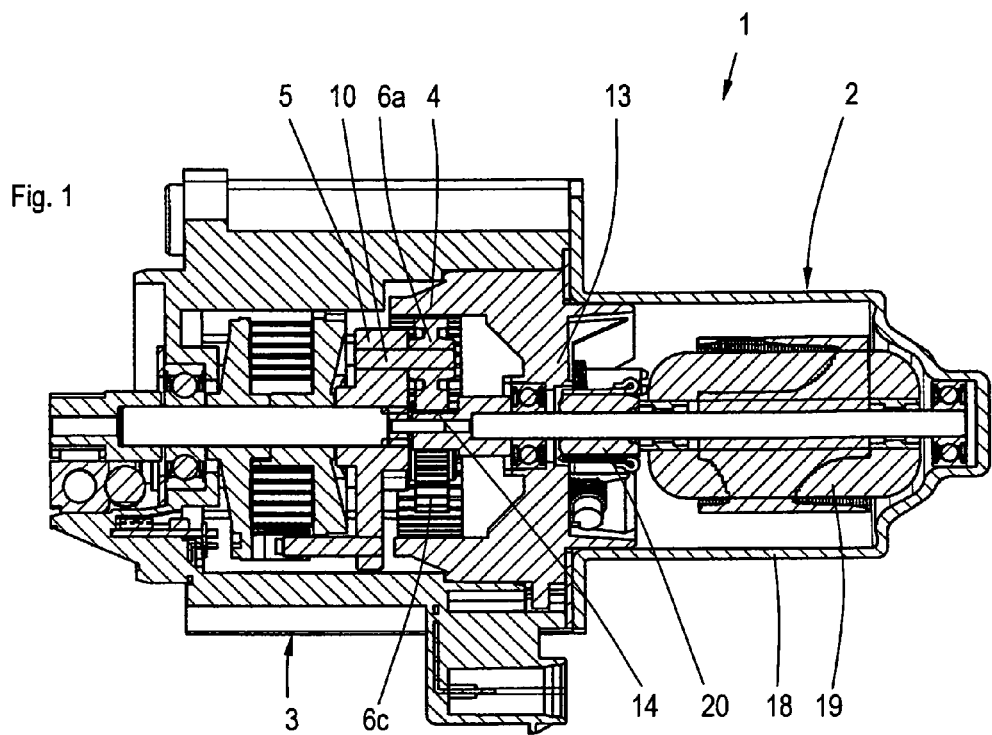
FIG. 1 shows a sectional view through a control drive according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

According to a first embodiment of the invention, the planet gears (6a, 6b, 6c) have different thicknesses in the axial direction. Time sequencing during assembly can therefore be achieved. However, a drawback is that different individual parts are necessary. In addition, this solution might lead to undesired noise at higher speeds, for which reason this embodiment is not preferred.

A second embodiment is characterized by the fact that the planet gears (6a, 6b, 6c) are mounted in different axial arrangements on the planet carrier (5), the planet gears having the same shape. Time decoupling of the engagement time of the planet gears is also achieved with this solution. Only one component must be changed, depending on the design of the planet carrier.

A drawback in the two embodiments just mentioned is also the axial mounting of the planet carrier in the installed state. This must occur on the planet carrier itself, because a contact surface in the ring gear or gear housing would require either an additional component or large axial play would have to be tolerated in at least two planet gears.

In order to implement the second embodiment, the planet carrier (5) has stud axles (10a, 10b, 10c), on which the planet gears (6a, 6b, 6c) are radially mounted, and the planet carrier (5) has stationary seat surfaces (11a, 11b, 11c), on which the planet gears (6a, 6b, 6c) are axially mounted, the stationary seat surfaces (11a, 11b, 11c) protruding axially to different extents. In a one-piece design of the planet carrier, for example, in a planet carrier originally made of plastic, these stationary seat surfaces can be produced without problem. In a planet carrier assembled from several individual parts, the advantages relative to the first embodiment can be lost.

In a third embodiment of the invention, it is proposed that the front surfaces (7a, 7b, 7c) of the planet gears (6a, 6b, 6c) be arranged in different axial positions in the assembled state, the planet gears (6a, 6b, 6c) having the same tooth width and stationary seat surfaces (15a, 15b, 15c or 16a, 16b, 16c) axially protruding on both sides of the teeth of planet gears (6a, 6b, 6c) to different extents. The ring gears are designed in one piece with hubs or connected by press-fit, the ring gears being arranged axially offset to different extents relative to the hub. With the planet gears assembled, identical parts can be used and the desired geometry achieved merely by different press-fit heights.

For the first and third planet gears (6a, 6c), they can be identically designed, being merely rotated by 180°, in order to achieve a different axial offset. The second planet gear (6b) differs from the first and third planet gears, but can be shaped symmetrically to a center plane and therefore mounted in both possible alignments.

The third embodiment makes it possible for the stationary seat surfaces (16a, 16b, 16c) of the side facing away from the planet carrier (5) to be arranged in the assembled state in connector one plane, on the one hand, and, on the other hand, for the stationary seat surfaces (15a, 15b, 15c) of the side facing the planet carrier to be arranged in one plane in the assembled state.

A fourth embodiment is particularly preferred, because the drawbacks of the previous embodiments can largely be avoided by it. In the fourth embodiment, it is proposed that none of the angle areas (8a, 8b, 8c) of the end (9) of ring gear (4) opposite the assembly direction (F) be part of a plane (12a, 12b, 12c), to which one of the other angle areas (8a, 8b, 8c) belongs, the planes (12a, 12b, 12c) being aligned parallel to each other and at right angles to the axis of symmetry of the control drive. The combinations among these three embodiments are also contemplated.

The following practical examples each show three planet gears per gear stage, and also only one gear stage, but the invention also includes planetary gear mechanisms with two, four or more planet gears per gear stage, and also multistage planetary gear mechanisms. The control drives can also include additional gear stages of other types of gears, like spur, worm or bevel gearing, and the motor axis need not be flush with the planetary gear mechanism axis.

FIG. 1 shows a sectional view through a control drive 1, consisting of an electric motor 2 and a planetary gear mechanism 3. The electric motor is a commutator motor with a housing canister 18, a wound rotor 19 with a commutator 20 and a brush rocker that serves as an end bracket 13. The planetary gear mechanism includes a ring gear 4, a sun gear 14, a planet carrier 5 and planet gears 6a, 6b, 6c. The output of the planetary gear mechanism 3 in the present practical example is connected to a rack-and-pinion drive. The control drive serves as an EGR drive.

FIG. 2 shows an assembled planet carrier 5 according to a first embodiment, in which it is equipped with three planet gears 6a, 6b, 6c of different widths. The faces 7a, 7b, 7c of the respective planet gears 6a, 6b, 6c lie in different planes parallel to each other, so that during assembly of the equipped planet carrier 5, the planet gear 6a initially, then 6b and finally 6c engage with the teeth of the ring gear in assembly direction F.

FIG. 3a shows a planet carrier 5 of a second embodiment of the invention (without stud axle 10), in which the planet carrier has stationary seat surfaces 11a, 11b, 11c, which consist of different parallel planes, i.e., the stationary seat surfaces protrude to different extents from the plane of the planet carrier (connector). The same planet carrier 5 is equipped with planet gears 6a, 6b, 6c in FIG. 3a. The planet gears have stationary seat surfaces 16a, 16b, 16c facing away from the planet carrier. On the opposite side of the planet gears 6a, 6b, 6c (concealed here), there are stationary seat surfaces 15a, 15b, 15c, which face the stationary seat surfaces 11a, 11b, 11c. The stationary seat surfaces 15a, 15b, 15c and 16a, 16b, 16c form the face surfaces of planet gear hubs 17a, 17b, 17c. The width of the planet gears in the second practical example is the same and the planet gears 6a, 6b, 6c are identically designed.

Figure 4:
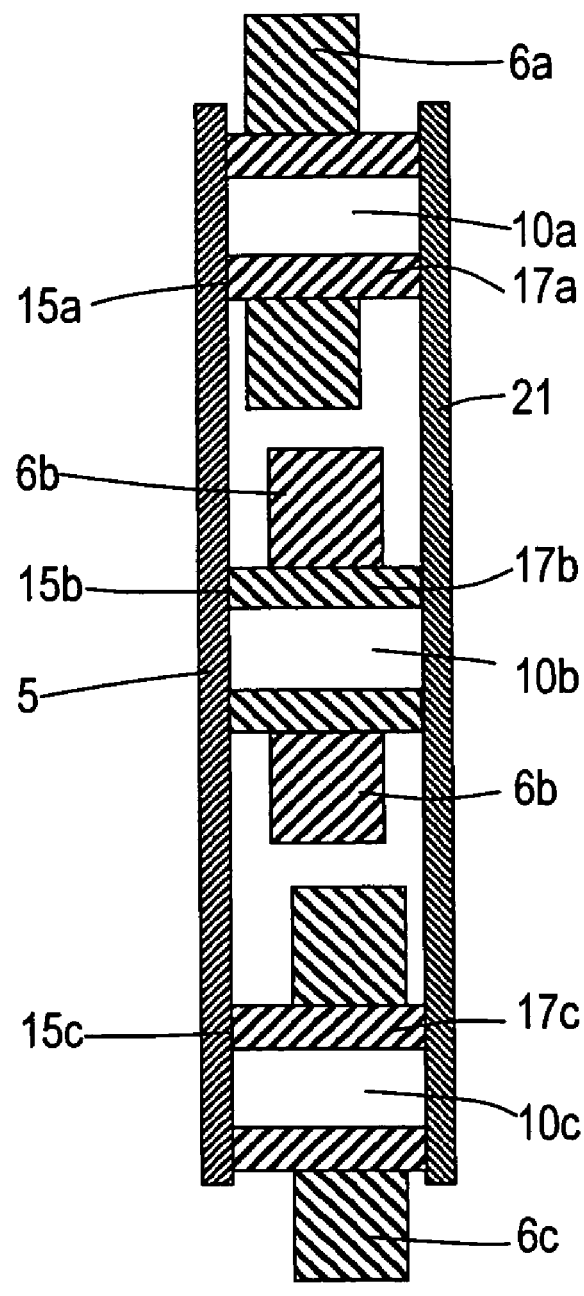

A third embodiment of the invention is shown in stylized fashion in FIG. 4. A planet carrier 5 has stud axles 10a, 10b, 10c, on which planet gears 6a, 6b, 6c are mounted to rotate. The planet gears have hubs 17a, 17b, 17c, whose front surfaces face the planet carrier 5 as stationary seat surfaces 15a, 15b, 15c, and whose opposite front surfaces face away from planet carrier 5 and serve as stationary seat surfaces 16a, 16b, 16c. The stationary seat surfaces 15a, 15b, 15c, as well as 16a, 16b, 16c, protrude to different extents and delimit the installation space of the planet gears 6a, 6b, 6c. An axial bearing washer, which can be arranged in the ring gear or can also be a component of the planet carrier, serves as axial support and limitation for the planet gears 6a, 6b, 6c. The planet gears 6a, 6b, 6c can be designed with their hub 17a, 17b, 17c in one piece as a plastic injection molded part. In this case at least two different die nests are required. Planet gear 6a is identical to planet gear 6c by rotation of 180°. Planet gear 6b differs from planet gears 6a and 6c, but can be designed symmetrically. It is also conceivable that the hub is mounted in the planet gears and fastened by press-fitting. In this embodiment, identical parts can be used, which need only be mounted differently.

Figure 5A:
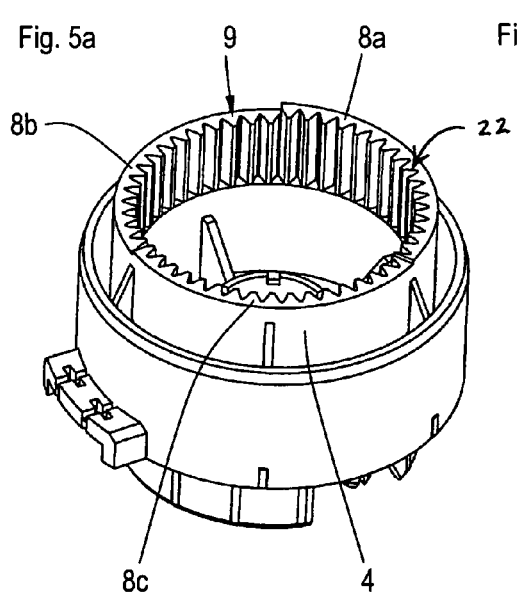
FIG. 5a shows a three-dimensional depiction of a ring gear according to the fourth embodiment.
Figure 5B:
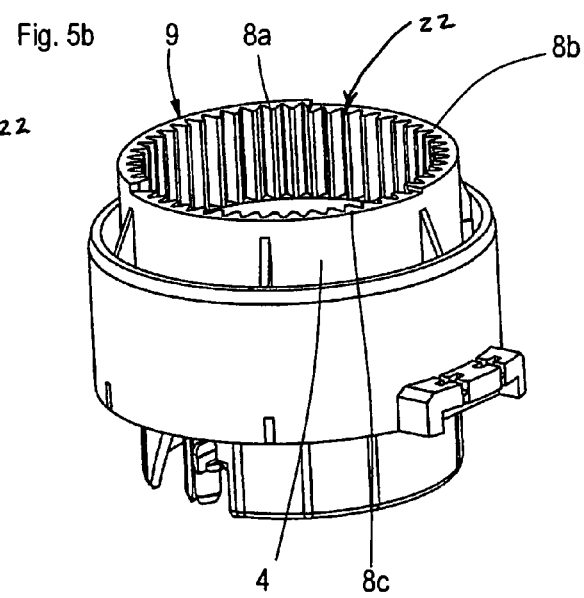
FIG. 5b shows a three-dimensional depiction of the ring gear from FIG. 5a from a different perspective.

FIGS. 5a and 5b show a ring gear 4 from a different perspective. This ring gear is part of the fourth and preferred embodiment of the invention. Here the planet gears are designed identically and the end 9 of the ring gear is divided into three areas 8a, 8b, 8c, each of which occupies about 120° of the periphery. The areas 8a, 8b, 8c protrude to different extents from the end 9 of ring gear 4.

Figure 6A:
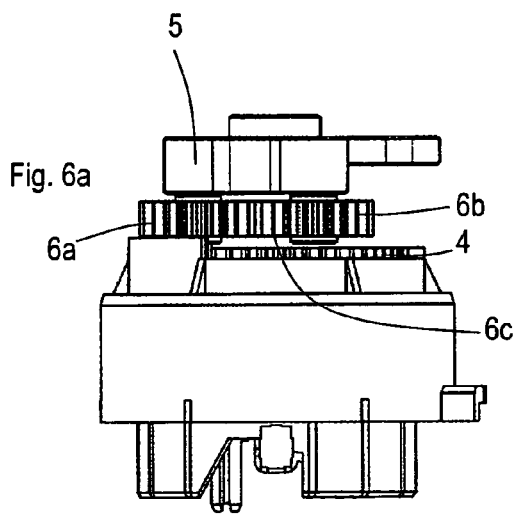
FIG. 6a shows a partial sectional view of a planetary gear mechanism before assembly of the planet carrier.
Figure 6B:
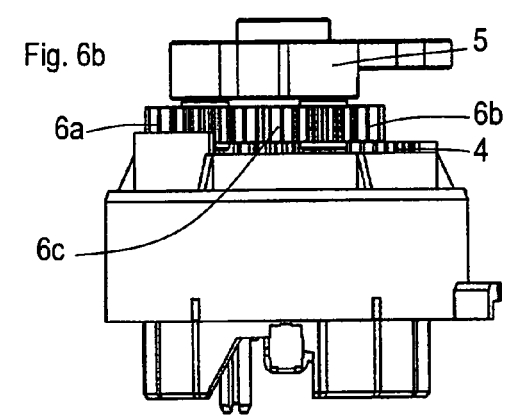
FIG. 6b shows a partial sectional view of the planetary gear mechanism in a first assembly phase.
Figure 6C:
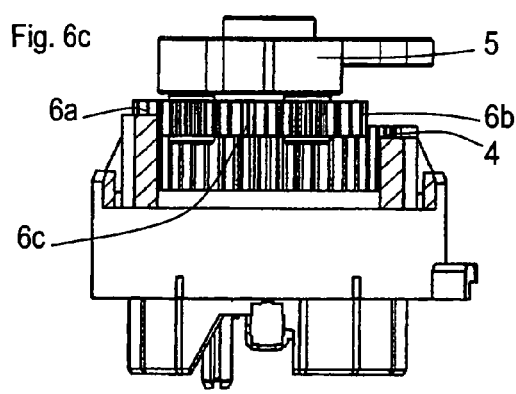
FIG. 6c shows a partial sectional view of the planetary gear mechanism in a second assembly phase.
Figure 6D:
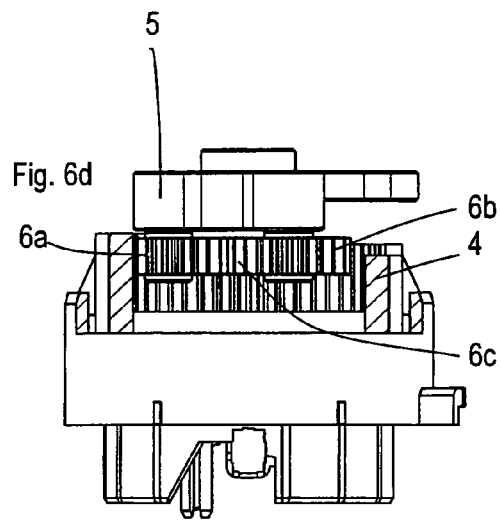
FIG. 6d shows a partial sectional view of the planetary gear mechanism in a third assembly phase.
Figure 6E:
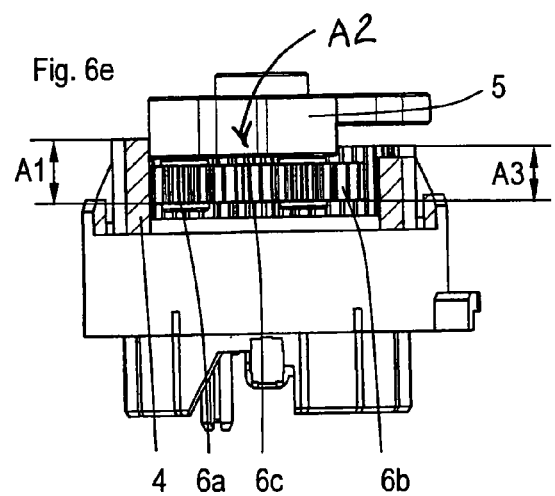
FIG. 6e shows a partial sectional view of the planetary gear mechanism in the final assembled position.

FIGS. 6a to 6e show the assembly phases in succession during assembly of an equipped planet carrier 5 in ring gear 4 of the planetary gear mechanism. FIG. 6a shows the assembly right before engagement of the first planet gear 6a. The first planet gear 6a in FIG. 6b is already engaged with ring gear 4 and planet gear 6b is right before engagement. The planet gear 6b in FIG. 6c is also already engaged with ring gear 4 and gear 6c is still not engaged. Only in FIG. 6d are all three planet gears 6a, 6b, 6c engaged. The final position is reached in FIG. 6d, in which the faces of planet gears 7a, 7b, 7c have different spacings in the assembly direction A1, (A2), A3 to the corresponding angle areas 8a, 8b, 8c of the end 9 of the ring gear.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described and illustrated.

LIST OF REFERENCE NUMBERS

1 Control drive
2 Electric motor
3 Planetary gear mechanism
4 Ring gear
5 Planet carrier
6 Planet gears
7 Front surface
8 Angle area
9 End
10 Stud axle
11 Stationary seat surface of the planet carrier
12 Plane
13 End bracket
14 Sun gear
15 Stationary seat surface of planet gears (facing planet carrier)
16 Stationary seat surface of planet gears (facing away from planet carrier)
17 Hub
18 Housing canister
19 Rotor
20 Commutator
21 Axial bearing washer
22 Engagement edge
23 Engagement edge

What is claimed is:

1. A control drive comprising:
an electric motor having an end bracket;
a planetary gear mechanism operatively connected to the electric motor along a longitudinal axis of symmetry, the planetary gear mechanism including
a ring gear connected to the end bracket and having a free end, there being an assembly direction F defined in a direction away from the motor and in the direction of the end of the ring gear;
a planet carrier;
a plurality of planet gears, each gear having peripheral external teeth, the planet gears being mounted on the planet carrier, each planet gear having a front surface relative to the assembly direction F in the area of their respective external teeth, and the ring gear having several angle areas made up of a plurality of internal teeth with a respective angle area assigned to each of the planet gears, the several angle areas being at the end of the ring gear in a predetermined angle position relative to the planet carrier, wherein a first axial spacing between the front surface of a first planet gear and a first angle area of the ring gear differs from a second axial spacing between the front surface of a second planet gear and a second angle area of the ring gear.

2. The control drive according to claim 1, wherein the axial spacing between the front surface of the second planet gear and the second angle area of ring gear differs from the axial spacing between the front surface of a third planet gear and a third angle area of the ring gear and the axial spacing between the front surface of the first planet gear and the first angle area of ring gear.

3. The control drive according to claim 2, wherein the differences in axial spacings are greater than the axial displacements of the engagement edges of the planet gears and the ring gear possible through unavoidable tolerances, so that, during assembly of the planet gears, only one planet gear can simultaneously reach the beginning of an engagement area between planet gear and ring gear.

4. The control drive according to claim 1, wherein the planet gears have different thicknesses in the axial direction.

5. The control drive according to claim 1, wherein the planet gears are mounted in different axial arrangements on the planet carrier, the planet gears being shaped identically.

6. The control drive according to claim 5, wherein the planet carrier has stud axles, on which the planet gears are radially mounted, and the planet carrier has axial stationary seat surfaces, on which the planet gears are axially mounted, the stationary seat surfaces protruding axially to different extents.

7. The control drive according to claim 1, further comprising a connector plane defined on the planet carrier wherein the front surfaces of the planet gears in the mounted state are arranged in different axial positions relative to the connector plane, the planet gears having the same tooth width and stationary seat surfaces protruding axially on both sides of the teeth of the planet gears to different extents.

8. The control drive according to claim 2, wherein the first planet gear and the third planet gear are identically shaped, but rotated by 180° relative to each other.

9. The control drive according to claims 2, wherein the second planet gear differs from the first and third planet gears and is shaped symmetrically, so that it can be mounted in two possible alignments.

10. The control drive according to claim 7, wherein the stationary seat surfaces of the side facing away from the planet carrier are arranged in one plane when mounted.

11. The control drive according to claim 7, wherein the stationary seat surfaces of the side facing the planet carrier are arranged in one plane when mounted.

12. The control drive according to claim 1, wherein none of the angle areas of the end of ring gear opposite the assembly direction F is part of a plane, to which one of the other angle areas belong, the planes being aligned parallel to each other and at right angles to the axis of symmetry of the control drive.

13. The control drive according to claim 1, wherein the ring gear is in one piece with the end bracket of electric motor and is made of plastic material.

* * * * *